UNITED STATES PATENT OFFICE

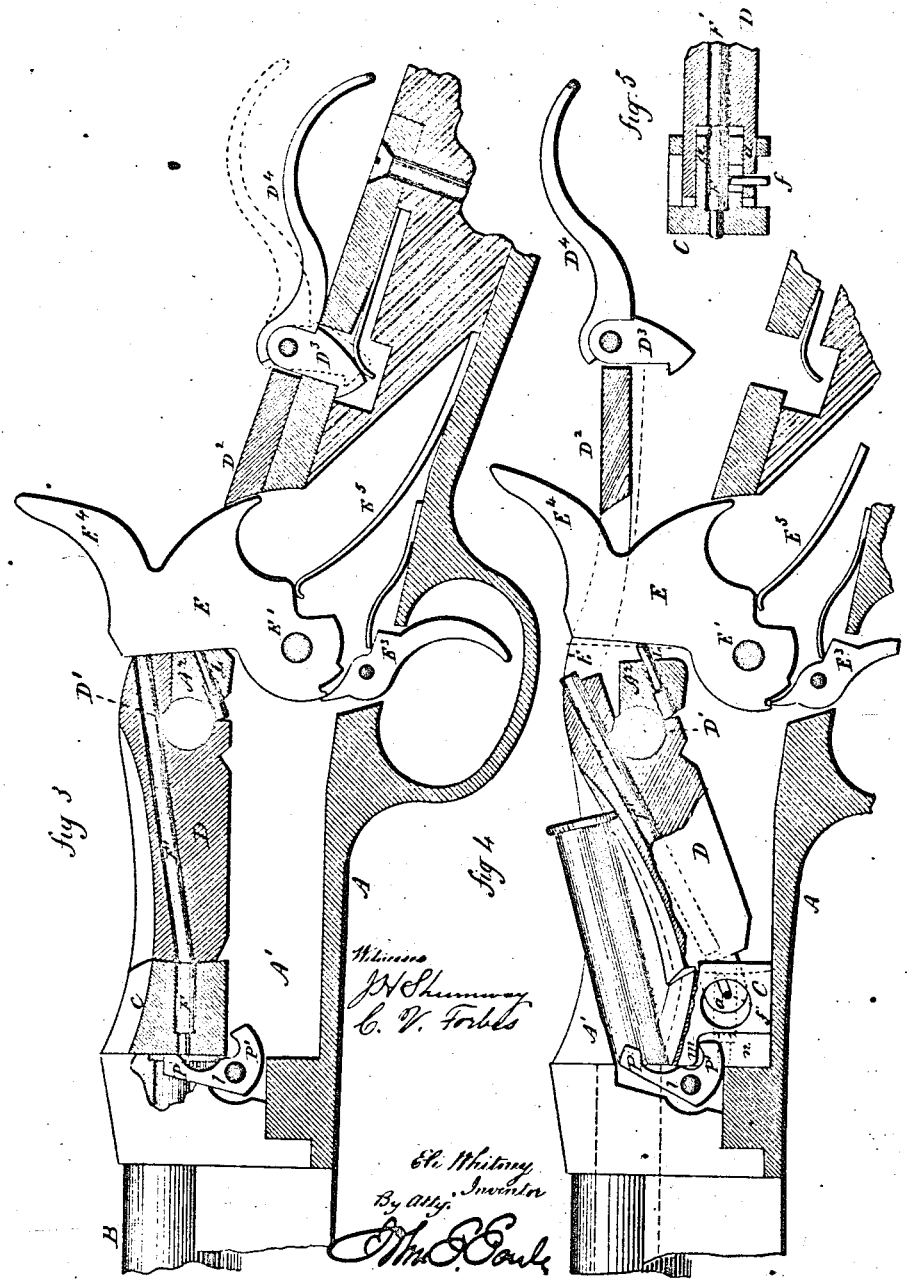

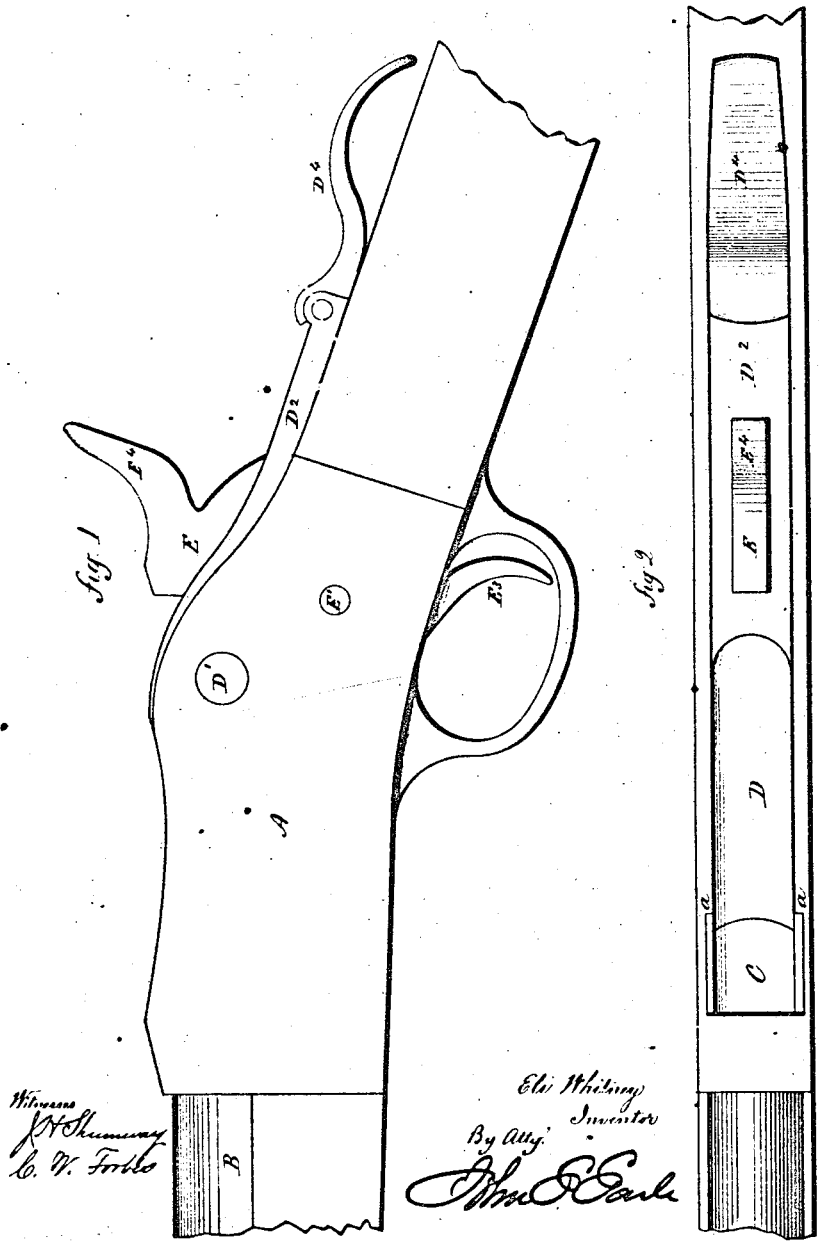

ELI WHITNEY, OF NEW HAVEN, CONNECTICUT.

IMPROVEMENT IN BREECH-LOADING FIRE-ARMS.

Specification forming part of Letters Patent No. 160,731, dated March 9, 1875; application filed December 31, 1874.

*To all whom it may concern:*

Be it known that I, ELI WHITNEY, of New Haven, in the county of New Haven and State of Connecticut, have invented a new Breech-Loading Fire-Arm; and I do hereby declare the following, when taken in connection with the accompanying drawings and the letters of reference marked thereon, to be a full, clear, and exact description of the same, and which said drawings constitute part of this specification, and represent in—

Figure 1, side view; Fig. 2, plan or top view; Fig. 3, longitudinal section; Fig. 4, longitudinal section, the parts in the position of breech open; Fig. 5, detached view.

This invention relates to an improvement in that class of breech-loading fire-arms in which the breech-block is moved vertically in a mortise, to open and close the breech.

The invention consists in certain new and useful combinations of a barrel open at the breech and rigidly attached to the frame, with a vertically-guided breech-piece and an operating-lever hung in rear of said breech-piece, and working in a mortise in the frame, the said lever and breech-piece so connected at the forward end of said lever that the downward movement of said forward end in the arc of a circle causes a corresponding vertical downward movement of the breech-piece to open the barrel, and the return of the said lever in like manner raises the breech-piece to close the barrel, as more fully hereinafter described.

A is the frame, to the forward end of which the barrel B is attached in the usual manner for breech-loading fire-arms, its rear end opening into a mortise, A', in the frame in rear of the barrel. In the forward end of this mortise, the breech-piece C is placed, the mortise for the length of the breech-piece being wider, so as to form shoulders $a$, (see Fig. 2,) between which and the extreme forward end of the mortise the breech-piece will move freely up and down, the shoulders $a$ forming guides for the proper vertical movement of the breech-piece, and also bearings to sustain the breech-piece in resisting the recoil of the explosion.

In rear of the breech-piece, the operating lever D is hung upon a pivot, $D^1$, the other arm $D^2$ of the lever extending back upon the upper side of the frame, and so that, by raising the rear end $D^2$ the lever turns upon the pivot $D^1$ and the forward end D will be correspondingly depressed, as seen in Fig. 4.

The forward end of the lever is hung to the breech-piece, so that as the forward end of the lever is depressed it carries down the breech-piece, and returning raises the breech-piece. This is best done by ears $a$ on the lever, working in corresponding recesses in the breech-piece.

The upper surface of the forward part D of the lever, and the upper surface of the breech-piece, are made concave transversely so as to form a conductor when down, as in Fig. 4, to guide the cartridge into the barrel.

In rear of the pivot $D^1$, the hammer E is hung upon its pivot $E^1$, and extends up through a mortise, $E^2$, in the rear part of the lever, so as to be cocked by means of the thumb-piece $E^4$, caught by the trigger $E^3$, and actuated by the mainspring $E^5$, substantially in the usual manner.

In the breech-piece the firing-pin F is arranged in substantially the usual manner for central or rim fire, as the case may be.

Through the lever D an auxiliary pin, $F^1$, is arranged, extending from the principal pin F to the rear, where the nose of the hammer will strike it, as in Fig. 3, the blow of the hammer communicated to the cartridge through the pins $F^1$ and F.

The rear end $D^2$ of the lever is secured to the frame by a latch, $D^3$, as seen in Fig. 3. This holds the breech-piece up in position for firing, and is released by raising the latch-handle $D^4$, as denoted in broken lines. The novel method of hanging the lever D constitutes an important feature in these improvements. The mortise in which the lever works does not extend quite back to the hammer-opening, but leaves a bridge, $A^2$, between the hammer and the lever-mortise. The lever extends down into the mortises in front of the bridge $A^2$ of the frame, thus forming a shoulder on the lever against the said bridge $A^2$. The pivot D cuts away the angle of this shoulder in the lever and a portion of the said bridge $A^2$, as seen in Figs. 3 and 4, the larger part of the pivot being in the lever; but the rear side of the pivot bears on the frame. This gives a firm and solid bearing for the lever, and this bearing being in a central line with the barrel, it follows that the shortest distance from the pivot to the front face of the breech-piece is when the breech is closed; hence the lever may be brought to a solid bearing against the breech-piece when closed, as seen in Fig. 3, and thus materially aid the shoulders $a$ in resisting the recoil. The bearing of the lever coming solidly against the frame at $A^2$, there is no such strain upon the pivot as would be the case if it were supported by its two ends only in the sides of the frame. This construction also enables the opening of the breech to set the hammer at half-cock by means of a spindle, L, in the part $A^2$ of the frame, extending from below the pivot up to the hammer. When the breech is closed, as in Fig. 3, the said spindle lies forward, its end against the lever D; hence, when the lever D is depressed, it will impart to the spindle a rearward movement, as denoted in Fig. 4. The rear end of the spindle, bearing against the hammer, forces it back to half-cock, as shown in Fig. 4. The rising of the lever D allows the spindle to return, leaving the hammer at half-cock.

In order to withdraw the firing-pin by the movement of the breech, a stud, $f$, extends from the pin F through a slot in the breech-piece into one of the ears $a$ of the lever D, as seen in Figs. 4 and 5. As the movement of the breech-piece is vertical while that of the ears is in the arc of a circle away from the breech-piece, it follows that thus connecting the firing-pin F with the lever it will receive a rear movement, according to the arc of the circle in which the lever moves, and this is sufficient to retract the firing-pin at least as much, and preferably more, than the required protension from the breech-piece, and that in returning the firing-pin may remain in the retracted position. The ear of the lever is slotted, so that having in its descent withdrawn the firing-pin on its return the slot will pass over the pin without returning so far as to protrude from the face of the breech-piece. P P' are the two arms of a bell-crank-lever ejector, hung in the frame upon a pivot, $l$, forward of the rear end of the barrel, one arm, P, extending up to about the central line of the barrel, and in such relative position to the bore of the barrel that the rim of the cartridge will lie against its rear side, in like manner as for similar ejectors in other arms. The other arm, P', extends rearward into a recess, $n$, in the breech-piece, this recess forming a shoulder, $m$, on the breech-piece at such point relative to the vertical movement of the breech-piece that so soon as the breech-piece has passed below the head of the cartridge the shoulder $m$ will strike the arm P' of the ejector, and the completion of the downward movement of the breech-piece imparts a quick turn to the lever, sufficient to eject the exploded shell or cartridge, as the case may be. This method of ejecting the cartridge necessitates the movement of the breech-piece below the bore of the barrel. To conveniently insert the cartridge, it is desirable to bring the breech-piece up above the lower side of the bore of the barrel, because in the act of inserting the cartridge the breech-piece is unavoidably depressed, unless it be brought to a dead stop in line with the barrel, and this is difficult to do. To thus raise the breech-piece a little above the lower side of the barrel, the turning of the lever D in opening the breech is made to force the hammer back a little beyond half-cock, as seen in Fig. 4; hence so soon as the lever is free the power of the mainspring will be exerted upon the lever D through the spindle L, and force the lever to rise until the hammer arrives, and is arrested at half-cock. This brings the breech-piece slightly above the lower side of the barrel, as denoted in broken lines, Fig. 4; then the unavoidable depression which comes upon the breech-piece and lever in the act of inserting the cartridge will not carry it below the lower side of the barrel. For this depression the mainspring readily yields.

In order that the breech-piece may be closed by the act of cocking the hammer, and thereby avoid the necessity of an independent movement of the hand to do so, as well as to insure the proper closing of the breech before firing, the rear side of the thumb-piece $E^4$ in cocking the hammer will bear against the rear end of the mortise $E^2$, and force down that end of the lever until it is latched in the position of the breech closed, as denoted in broken lines, Fig. 3, and this latching occurs just as the hammer passes onto the full cock.

What I claim as my improvement in fire-arms, and desire to secure by Letters Patent, is—

1. The combination of a barrel open at the breech, a vertically-sliding breech-piece, a lever pivoted in rear of said breech-piece, the forward arm of which is in connection with said breech-piece, the other arm extending in the rear of the pivot above the frame, the arrangement of the parts being substantially such as described, whereby the raising of the rear arm of the said lever throws down the said breech-piece to open the barrel, and returning said lever raises the said breech-piece to close the barrel.

2. The combination of a barrel open at the breech, a vertically-sliding breech-piece, provided with a loose firing-pin, a lever pivoted in rear of said breech-piece, the forward arm of which is in connection with said breech-piece, and provided with an auxiliary firing-pin, the other arm extending to the rear of said pivot above the frame, the arrangement of the said pivot being such relatively to the said vertically-sliding breech-piece that the shortest distance between said pivot and the forward or closing surface of said breech-piece is when the breech is closed, and that the arc described by the forward end of the lever in opening the breech will cause said forward end of the lever to retreat from the breech-piece, substantially as described.

3. The combination of a barrel open at the breech, a vertically-sliding breech-piece, provided with a loose firing-pin, a lever pivoted in rear of said breech-piece, the forward arm of which is in connection with said breech-piece, and provided with an auxiliary firing-pin, the other arm extending to the rear of said pivot above the frame, the arrangement of the said pivot being such relatively to the said vertically-sliding breech-piece that the shortest distance between said pivot and the forward or closing surface of said breech-piece is when the breech is closed, and that the arc described by the forward end of the lever in opening the breech will cause said forward end of the lever to retreat from the breech-piece and the said lever connected to the principal firing-pin, so that said retreating movement of the lever will withdraw said principal firing-pin, substantially as described.

4. The combination of the breech-closing lever D D$^2$, the bridge A$^2$ in rear of the forward part of the lever, the pivot of the lever taking its bearing on said bridge, substantially as described.

5. The combination of the breech-closing lever D D$^2$, the bridge A$^2$, spindle L in said bridge, and the hammer E, with its mainspring and trigger, substantially as described.

ELI WHITNEY.

Witnesses:
JOHN E. EARL,
C. V. FORBES.